United States Patent Office

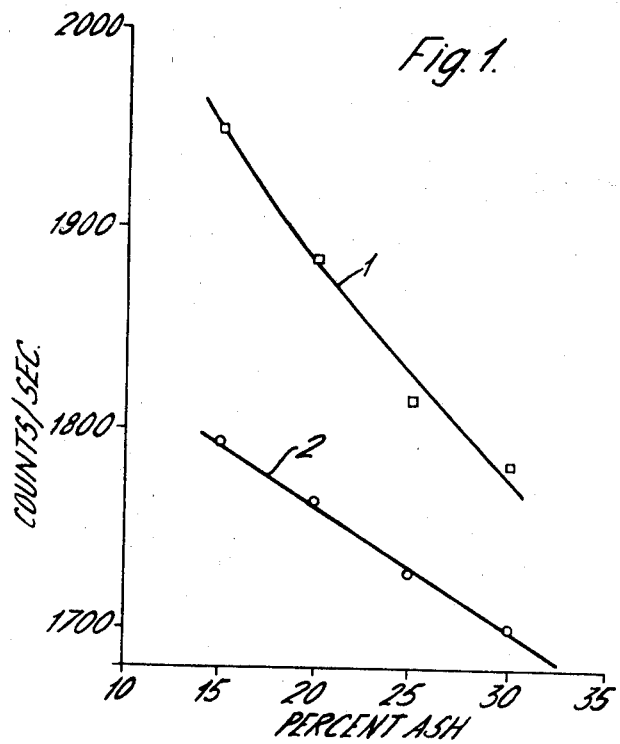
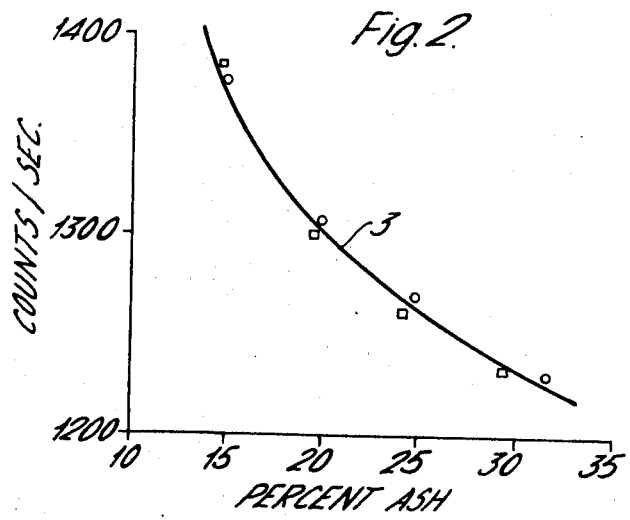

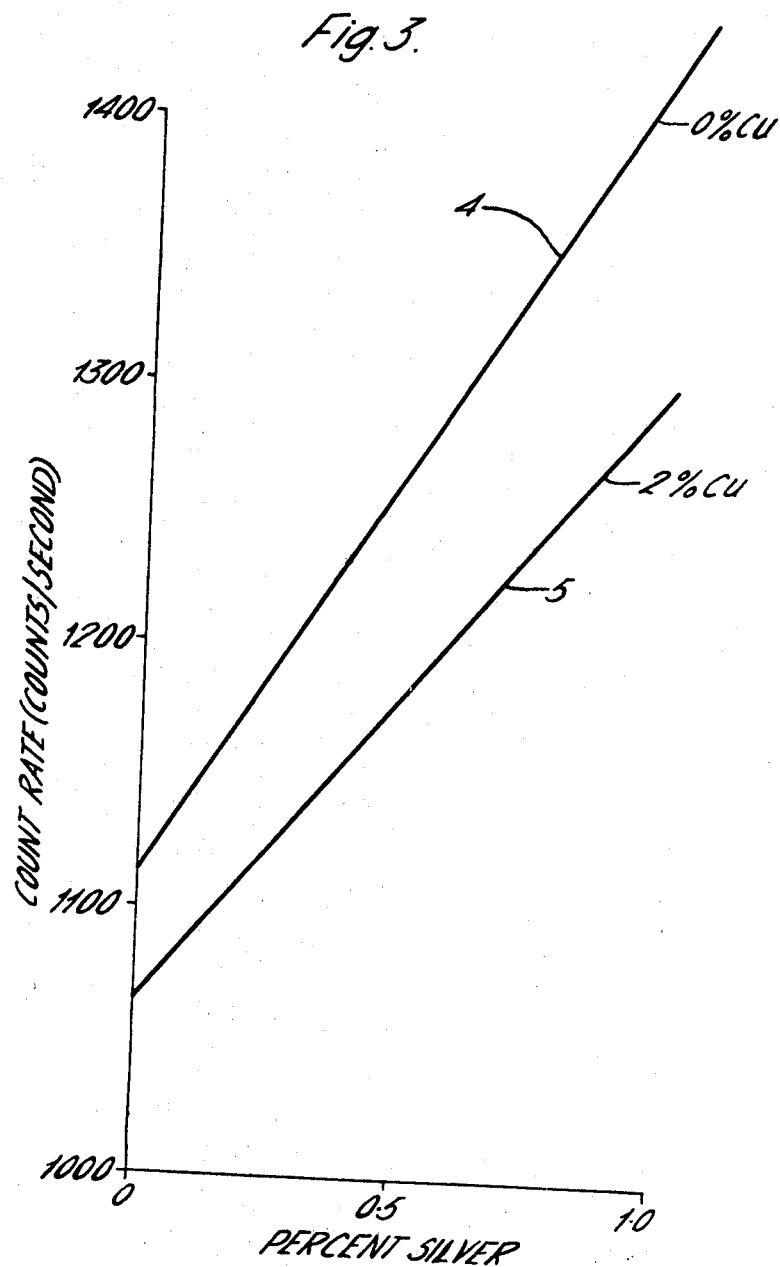

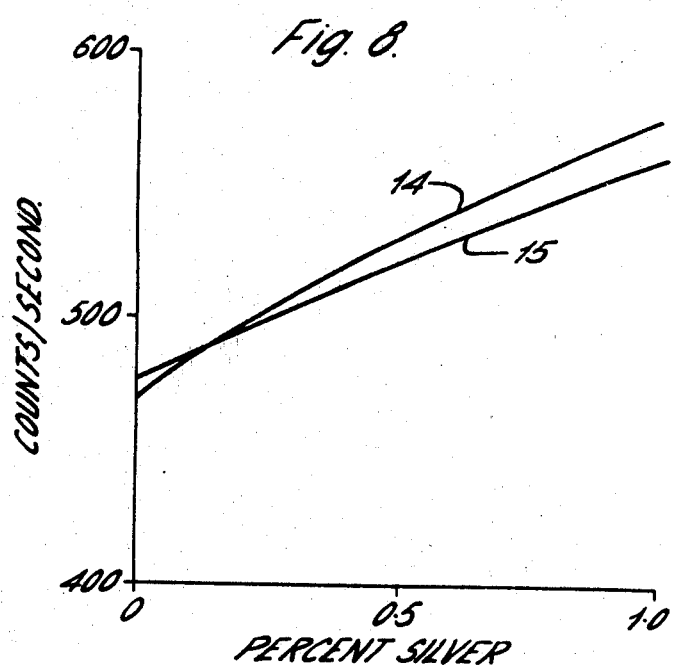
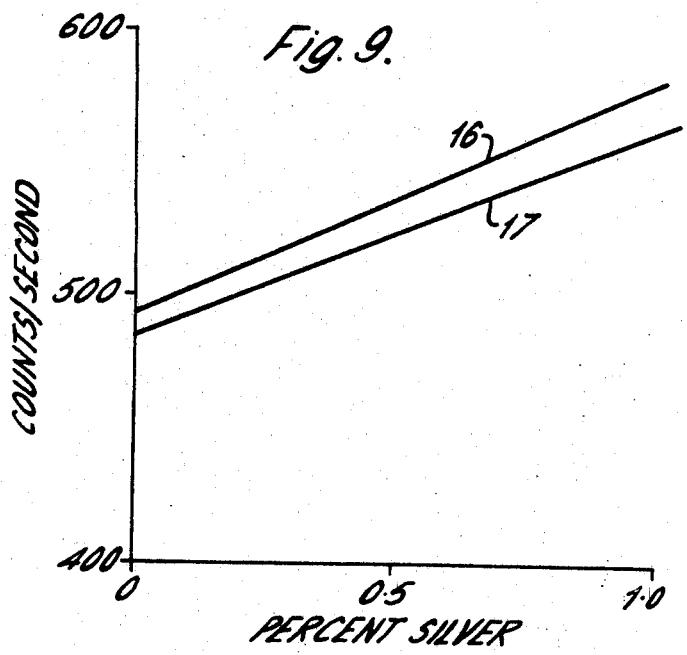

3,496,353
Patented Feb. 17, 1970

3,496,353
X-RAY ANALYSIS METHOD FOR COMPENSATING FOR THE MATRIX ABSORPTION EFFECT
John R. Rhodes, Wallingford, Berks, England, assignor to United Kingdom Atomic Energy Authority, London, England
Filed Sept. 8, 1965, Ser. No. 485,708
Claims priority, application Great Britain, Sept. 11, 1964, 37,237/64; Mar. 19, 1965, 11,886/65
Int. Cl. G01n 23/20
U.S. Cl. 250—51.5                                6 Claims

ABSTRACT OF THE DISCLOSURE

A method for the determination of a wanted element in a sample containing at least one interfering element using X-ray techniques and backscatter geometry comprises directing X-rays from a radioisotope source onto a target so as to generate an X-ray beam having two energy components, directing the X-ray beam onto the sample and measuring the total intensity of X-rays back-scattered from the sample. The first component of the X-ray beam is selected to have an energy so as to provide X-rays from the sample which are either back-scattered X-rays or fluoroescent X-rays from the wanted element while the second component of the X-ray beam is selected to excite fluorescent X-rays from the interfering element. The energy bands of the X-ray components are selected so as to be different and their relative intensities are adjusted to give compensation for the matrix absorption effect.

---

The present invention relates to methods of X-ray analysis.

Two of the methods used in X-ray analysis are termed, respectively, X-ray backscatter analysis and X-ray fluorescence analysis. In the first of these methods, X-rays from a source are passed into a sample and the intensity of the X-rays back-scattered from the sample is measured. In the second method, X-rays are passed into a sample and the intensity of the fluorescent X-rays excited in a wanted element is measured commonly using backscatter geomety, these fluorescent X-rays conveniently being isolated by the use of a pair of differential filters. In either method, the intensities measured are dependent on the amount of the material whose concentration is being determined. However, in many cases, for example ash in coal analysis, analysis of tin ores, copper ores and zinc ores, there may be present in the sample an element which affects the intensity of the X-rays being measured. Such an element is termed an "interfering element" and in general the effect such interfering elements produce is that termed the "matrix absorption" effect. The result of the matrix absorption effect is to produce variations in the measured X-ray intensity which are dependent not only on variations in the concentration of the wanted element but also on the concentration of the interfering element, the intensity of the wanted X-rays decreasing as the concentration of the interfering element increases. Thus, unless some allowance is made for such an effect, accurate measurement of the amount of wanted material will not be possible if an interfering element is present.

It is the object of the present invention to provide a new or improved method of X-ray analysis.

According to the present invention there is provided a method of X-ray analysis for the determination of a wanted element in a sample containing at least one interfering element comprising passing into the said sample, incident X-rays comprising an analytical X-ray component and at least one compensating X-ray component, the energy band of each of said components being different from that of each other of said components, the analytical X-ray component having an energy band to give back-scatter from or to excite fluorescence in the wanted element in the sample and each compensating X-ray component having an energy to excite fluorescence in at least one of the interfering elements, and measuring the total intensity of X-rays passing from the sample in a back-scattered direction, the relative intensities of the various components of the incident X-rays being selected to give compensation for the matrix absorption effect.

In some cases it might be preferred that intensities of the components of the incident X-rays are selected to give a slight overcompensation, the intensity of the X-rays being measured through a suitable energy sensitive filter, for example of aluminium.

Compensation is effected by a careful choice of the intensities of the various energy components of the incident X-rays and this choice is also dependent on the energy band of each component. The energy band of each incident X-ray component is selected, as far as possible, for maximum efficiency in obtaining a required response from the sample. Thus, using an X-ray back-scattering technique, the energy band of the analytical component is selected to give efficient back-scattering from the sample whilst for an X-ray fluorescent technique, the energy band of the analytical component is selected to efficiently excite fluorescence in the wanted element. The compensating components as far as possible are selected to give efficient excitation of fluorescence in the interfering element.

The incident X-rays may be obtained from any suitable source, or sources, for example, a number of radio isotope sources, each of which produces essentially monochromatic X-rays. We prefer where possible however, to use a source-target combination of the type described in co-pending United States patent application Ser. No. 485,773 by J. R. Rhodes, of even date herewith.

Essentially such apparatus comprises a radio-isotope X-ray source located within a generally concave target, the open end of the target having arranged around its perimeter one or more X-ray detectors. The target is conveniently frusto-conical with an annular measuring surface, for example the window of a gas filled detector or the crystal of a scintillation counter, arranged around it. An annular filter may be provided to be located above the annular measuring surface.

The target may provide the required incident X-ray components by the excitation of fluorescence in the constituents of the target, one of the incident X-ray components possibly resulting from the back-scatter, by the target, of X-rays from the radio isotope source. If back-scattered radiation is required from the target the target mixture may be selected to include a material which gives efficient scattering of the X-rays incident from the source.

It will be appreciated that the constituents of the target mixture and their proportions, are selected partly in dependence on the radio-isotope source used and partly in dependence on the material to be analysed and the nature of the interfering element. The nature of the constituents of the target will determine the energy bands of the various components of the incident X-rays, whilst the intensities of these X-rays will be dependent on the proportions of the constituents in the target and the efficiency of excitation of the constituents by the source. It will be appreciated that with a monochromatic X-ray source the efficiency of excitation will not be the same for all constituents of the target and in some cases the efficiencies of excitation may be considerably different for two different constituents. If a continuous spectrum source, for example a bremsstrahlung source, is used however, the efficiency of excitation of the different constituents may be expected to show less variation. An alternative method of obtaining spectrally pure multiple X-ray energies is to use a target of high atomic number, whereby excitation of the K X-rays also results in excitation of the L X-rays in cascade with an efficiency and purity equal to those of the K X-rays. It will however be appreciated that such an arrangement is only of limited applicability.

Thus, by a careful selection of the source and the constituents of the target, it is possible to produce incident X-rays of the desired energies for the analysis. However, due to inefficient excitation of one of the constituents of the target, it may not be possible to obtain complete compensation with a source-target combination and a conventional detector. Compensation may then be attained by the use of a detector which has a greater efficiency for the detection of the low energy fluorescent X-rays from the interfering element than for the higher energy X-rays back-scattered by the sample or the fluorescent X-rays from the wanted element. It should however be appreciated that such an arrangement is not within the scope of the present invention.

It will be appreciated that when a matrix absorption effect occurs the interfering element normally interfers by absorbing some of the analytical X-rays and emitting these as fluorescent X-rays characteristic of the interfering element and usually having an energy considerably below that of the analytical X-rays, the X-rays back-scattered from the sample (using back-scatter analysis techniques) or the fluorescent X-rays excited in the wanted element (using an X-ray fluorescence analysis technique). Thus, it is possible to use a suitable filter, for example of aluminium, to give differential attenuation of the X-rays to be measured and to reduce the intensity of the low energy X-rays by a greater proportion than the intensity of the higher energy X-rays is reduced.

Consequently it is preferred that the incident X-ray components are arranged to give slight over compensation and the wanted essentially exact compensation is then obtained by the use of such a filter.

It will be appreciated that exact compensation may be obtained by a suitable choice of the energies and intensities of the incident X-ray components but it should be realised that such compensation is exact only for a sample having a given composition and it is more simple to compensate by the use of a series of filters than by a series of sources of different intensity, if several sources are being used to provide the incident X-ray components, or a series of targets of varying composition, if a source-target combination is being used.

It will be realised that the present invention depends on the excitation of fluorescence in the interfering element and the increase in the intensity of the fluorescent X-rays of the interfering element as the concentration of this element increases. Since the matrix absorption effect produces a decrease in the intensity of the back-scattered X-rays from the sample and the fluorescent X-rays from the wanted element as the concentration of the interfering element increases, a suitable choice of exciting X-rays would result in the intensity of the fluorescent X-rays of the interfering element increasing at the same rate as the intensity of the other X-rays decreases, thus giving the desired compensation. If the rate of increase was greater than the rate of decrease then over-compensation would result and this may be corrected by the use of a suitable filter as explained.

In order that the present invention may more readily be understood, several embodiments thereof will now be described by way of example, reference also being made to the accompanying drawings wherein:

FIGURE 1 is a graph showing the effect of using a single energy component incident X-ray for ash in coal analysis;

FIGURE 2 is similar to FIGURE 1 when using a two energy component incident X-ray;

FIGURE 3 shows the effect of copper on silver analysis with no compensation;

FIGURE 8 shows the effect of a thicker filter; and

FIGURE 9 shows the effect of an even thicker filter.

Example 1

Figure 4:
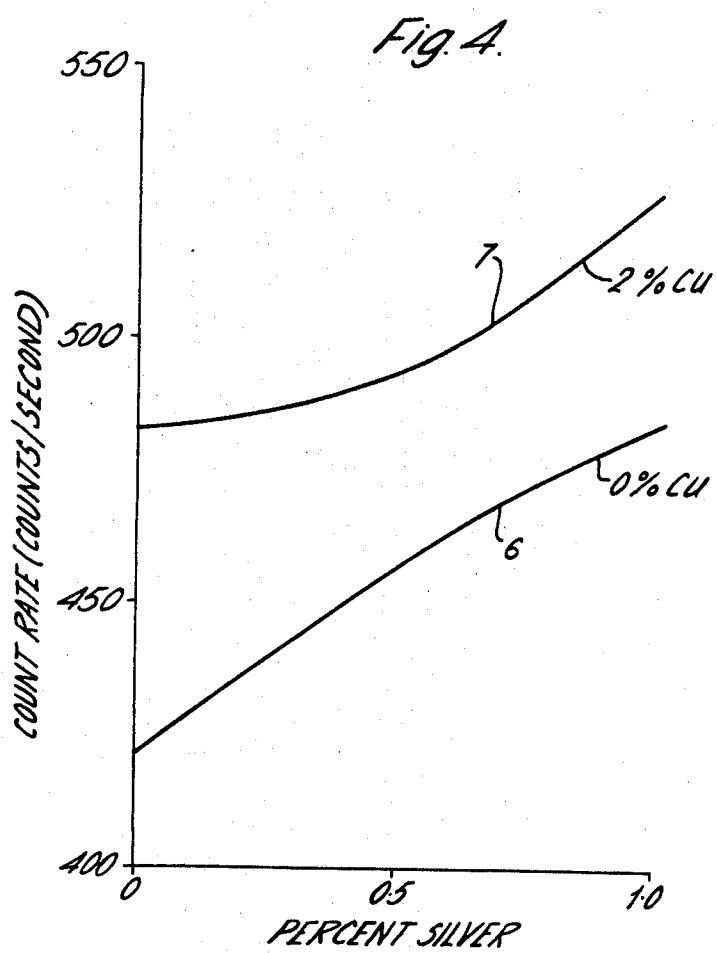
FIGURE 4 is similar to FIGURE 3 with over-compensation.

Two samples of coal, one containing 5–10% of iron oxide ($Fe_2O_3$) in the ash and the other 40–70% of iron oxide in the ash, and having varying ash contents, were analysed using an X-ray back-scatter analysis technique. For convenience the two samples will be termed "low iron" and "high iron" coals respectively.

The coal samples were analysed using a cadmium-109 radioisotope source (source strength about 3 mc.) which emits 22 kev. X-rays, and thus the incident X-rays in this case were of a single energy only. The results obtained are shown in FIGURE 1, curve 1 being obtained with the low iron coal and curve 2 with the high iron coal. It will be observed that no compensation is obtained using this arrangement.

The analysis was then repeated using a source target combination. The source was again a cadmium-109 radioisotope. The target was 65% by weight of selenium powder dispersed in 35% by weight of an epoxy resin. The 22 kev. X-rays from the source excited the selenium K X-rays which have an energy of 11.2 kev. A considerable quantity of the incident 22 kev. X-rays from the source undergo scattering by the target which contained a material of low atomic number and was thus capable of efficient scattering. Thus, the incident X-rays contained two components, an analytical component consisting of the 20–22 kev. X-rays back-scattered from the target and a compensating component consisting of the 11.2 kev. selenium K X-rays.

The 11.2 kev. X-rays excited the iron K X-rays (6.4 kev.) and the 20–22 kev. X-rays were back-scattered by the sample to an extent dependent on the mean atomic number of the sample. Since the mean atomic number is dependent both on the ash content (which is wanted) and the composition of the ash (which is not wanted), it is desired to remove the effect of variations in the ash composition. Since this effect is primarily due to variations in the iron content of the ash, compensation is obtained by compensating for iron as the interfering element.

The X-rays emitted by the coal samples in a back-scattered direction consisted of back-scattered 20–22 kev. X-rays, some back-scattered 11.2 kev. X-rays and the iron K X-rays of 6.4 kev. The total intensity of these X-rays was then measured directly by the counter.

The results obtained are given in FIGURE 2, the points obtained with the low iron coal being indicated by squares and those obtained with the high iron coal being indicated by circles. It will be seen that the results are essentially independent of the iron content and dependent only on the ash content. The curve 3 is the calibration curve thus obtained using this arrangement and the results indicated.

The selenium may be replaced by another element, for example nickel, which will excite iron K X-rays reasonably efficiently, but in such a case it may prove necessary to change the relative amounts of element and epoxy resin in the target.

Example 2

Compensation may also be obtained when using an X-ray fluorescent analysis technique and back-scatter geometry. The incident X-rays were obtained from a source target combination and the sample being studied was a silver ore containing copper as an interfering element.

The detector was a scintillation counter with a top level discriminator to eliminate large pulses from the detection of radiation of energy greater than 40 kev. and a bottom level discriminator to eliminate noise and small pulses resulting from the detection of radiation of energy less than 4 kev.

The radio isotope source was americium-241 having a source strength of about 2.5 mc. The target was varied to show the effect of target composition, and thus the composition of the incident X-rays on the compensation obtained.

The target used to obtain the results shown in FIGURE 3 consisted of 5 grammes of tin powder in 2.2 grammes of epoxy resin. Curve 4 was obtained in the absence of copper and curve 5 in the presence of 2% of copper. It will be observed that little, if any, compensation was obtained since the incident X-rays contained essentially only one energy component, the 25 kev. tin K X-rays, which gave little excitation of the copper present and thus insufficient copper X-rays were excited to give compensation.

The results in FIGURE 4 were obtained using a target of composition; 4 grammes of selenium powder, 1 gramme of tin powder and 2.2 grammes of epoxy resin. Curve 6 was obtained in the absence of copper and is below curve 7 which was obtained in the presence of 2% of copper and thus it can be deduced that the copper X-rays are now being excited in a sufficient quantity to give over-compensation. The incident X-rays in this case will be of two energies, the 25 kev. tin K X-rays and the 11.2 kev. selenium K X-rays, but exact compensation is not obtained since the quantities of the two X-ray components are not in the correct relative proportions.

Figure 5:
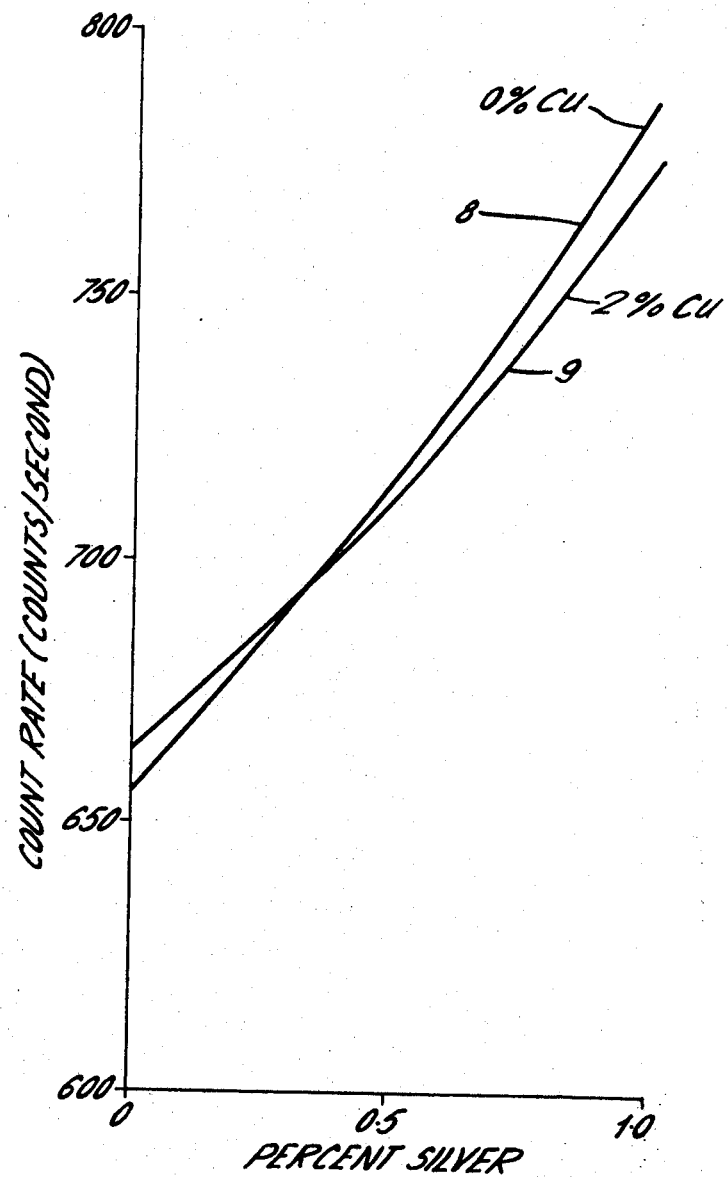
FIGURE 5 is similar to FIGURE 3 with almost exact compensation.

In FIGURE 5, curve 8 was obtained in the absence of copper and curve 9 in the presence of 2% of copper. It will be observed that these curves are close together and cross at one point. Thus, almost exact compensation has been obtained. The target in this case consisted of 2.5 grammes of selenium powder, 2.5 grammes of tin powder and 2.2 grammes of epoxy resin. The two components of the incident X-rays were again 25 kev. and 11.2 kev., but in different proportions to those which gave the results of FIGURE 4, this being due to the different target composition. With these incident X-rays, the copper K X-ray was excited in an amount sufficient to give almost exact compensation for the interfering effect of the copper.

Example 3

A series of experiments were carried out to show the effect of a filter, the results being summarised in FIGURES 6–9.

Figure 6:
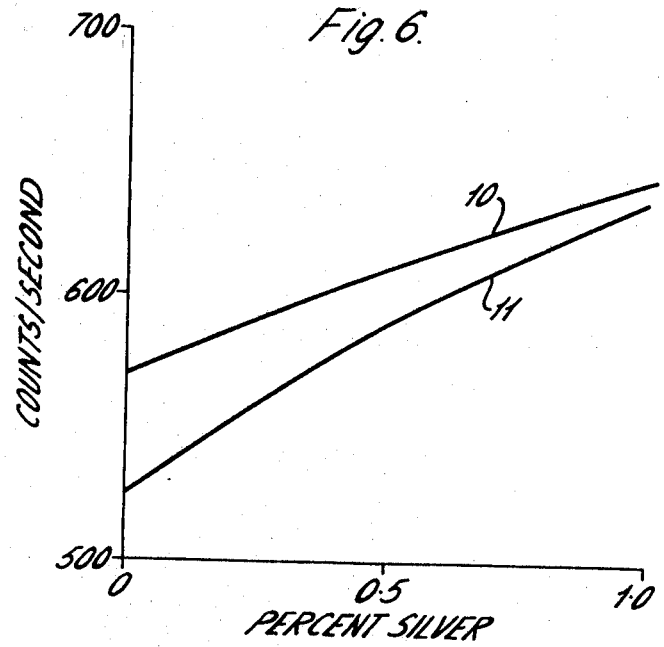
FIGURE 6 is similar to FIGURE 4 with a different degree of overcompensation.

The arrangement was similar to that described in Example 2 using a target of composition three grammes of selenium powder, two grammes of tin powder and 2.2 grammes of epoxy resin to give overcompensation. Curves 10 (copper absent) and 11 (2% copper present) of FIGURE 6 show the results obtained using this arrangement and no compensating filter.

Figure 7:
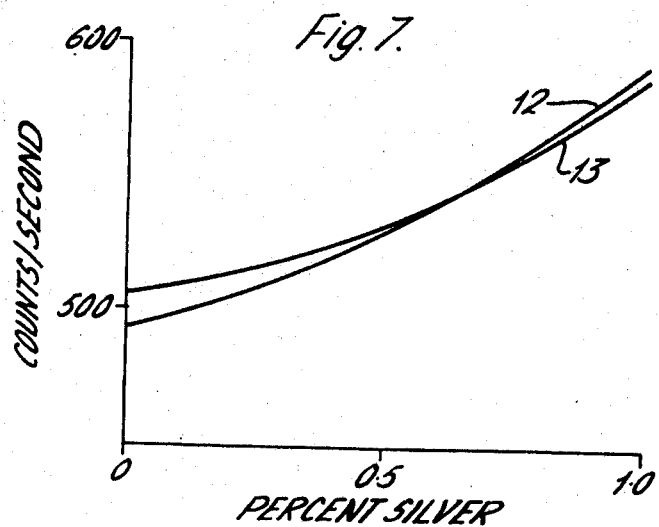
FIGURE 7 shows the effect of a filter.

Curve 12 (no copper) and 13 (2% copper) of FIGURE 7 show the effect of an aluminium filter of thickness 0.00004 inch. It will be observed that curves 12 and 13 are almost coincident, thus indicating that the filter has provided a substantial degree of compensation.

The results of FIGURE 8 were obtained with an aluminium filter of thickness 0.001 inch and curves 14 (no copper) and 15 (2% copper) show that this filter has slightly overcorrected the initial overcompensation and that the system is now slightly undercompensated.

The undercompensation is increased, see FIGURE 9, when a filter thickness of 0.006 inch is used when curves 16 (no copper) and 17 (2% copper) are obtained.

Examples 2 and 3 thus show that compensation may be obtained by variation of the target composition or by obtaining slight initial overcompensation and using a filter.

It will be appreciated that many variations of the present invention are possible to obtain compensation using back-scatter geometry and that the invention is not restricted to the particular embodiments described herein.

I claim:

1. A method for the determination of a wanted element in a sample containing at least one element which gives interference by a matrix absorption effect using an X-ray analysis technique and backscatter geometry, such method comprising the steps of directing X-rays from a radio-isotope source onto a target, thereby to generate an X-ray beam having a first higher energy component comprising X-rays backscattered from the target and at least one second lower energy component comprising fluorescent X-rays generated in the target material, and passing said X-ray beam into the sample and measuring the total intensity of X-rays passing from the sample in a back-scattered direction wherein the first component of said X-ray beam is selected to have an energy to provide from the sample X-rays selected from the group consisting of X-rays backscattered by the sample and fluorescent X-rays from the wanted element in the sample, at least one second component of said X-ray beam is selected to have an energy band to excite fluorescence in at least one of the interfering elements, the energy band of each X-ray component being selected to be different from the energy band of each other X-ray component and the intensities of the X-rays components being adjusted to give at least almost exact compensation for the matrix absorption effect.

2. The method of claim 1 wherein the intensity of the compensating component is in excess of that to give exact compensation, the X-rays passing from the sample in a back-scattered direction are passed through a filter and the total intensity of the filtered X-rays is measured.

3. The method of claim 1 when used for the determination of ash in coal wherein the X-ray beam consists of a first X-ray component having an energy in the range 20–22 kev. and a second component having an energy of 11.2 kev.

4. The method of claim 3 including the additional step of directing X-rays from a cadmium-109 radio-isotope source onto a target comprising a mixture of selenium and an epoxy resin.

5. The method of claim 1 when used for the determination of silver in the presence of copper as an interfering element wherein the X-ray beam consists of a first X-ray component having an energy of about 25 kev. and a second component having an energy of 11.2 kev.

6. The method of claim 5 including the additional step of directing X-rays from an americium-241 radio-isotope source onto a target comprising a mixture of selenium and tin in an epoxy resin.

References Cited

UNITED STATES PATENTS 2,964,631 12/1960 Foster.

ARCHIE R. BORCHELT, Primary Examiner

A. L. BIRCH, Assistant Examiner